United States Patent [19]

Takahara et al.

[11] 4,222,890
[45] Sep. 16, 1980

[54] GADOLINIUM-ACTIVATED PHOSPHATE PHOSPHOR

[75] Inventors: Takeshi Takahara, Yokosuka; Toshio Nishimura; Akira Fujita, both of Yokohama, all of Japan

[73] Assignee: Tokyo Shibaura Electric Co., Ltd., Tokyo, Japan

[21] Appl. No.: 4,264

[22] Filed: Jan. 17, 1979

Related U.S. Application Data

[63] Continuation of Ser. No. 852,530, Nov. 17, 1977, abandoned.

[30] Foreign Application Priority Data

Nov. 22, 1976 [JP] Japan .................................. 51/139514
Feb. 18, 1977 [JP] Japan .................................. 52/16038

[51] Int. Cl.² .............................................. C09K 11/46
[52] U.S. Cl. ......................... 252/301.4 P; 252/301.6 P
[58] Field of Search ................... 252/301.4 P, 301.6 P

[56] References Cited

U.S. PATENT DOCUMENTS

| | | | |
|---|---|---|---|
| 2,575,755 | 11/1951 | Froelich et al. ............... | 252/301.6 P |
| 3,542,690 | 11/1970 | Borchardt ..................... | 252/301.4 P |
| 3,544,483 | 12/1970 | Lagos .......................... | 252/301.4 P |
| 3,600,324 | 8/1971 | Bril et al. ...................... | 252/301.4 P |
| 3,936,633 | 2/1976 | DeKalb et al. ............ | 252/301.4 P X |
| 4,038,203 | 7/1977 | Takahashi ..................... | 252/301.4 P |

OTHER PUBLICATIONS

Ropp, "J. Electrochem. Soc.," vol. 111, No. 3, pp. 311–317, 1964.
Peters, "J. Electrochem. Soc.," pp. 985–988, Jul. 1969.

Primary Examiner—Jack Cooper
Attorney, Agent, or Firm—Cushman, Darby & Cushman

[57] ABSTRACT

A gadolinium-activated phosphate phosphor expressed by the general chemical formula:

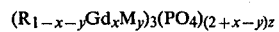

$$(R_{1-x-y}Gd_xM_y)_3(PO_4)_{(2+x-y)z}$$

where R denotes calcium, zinc, strontium, barium, or magnesium; M represents thallium, silver, lithium, barium, sodium, potassium, rubidium or cesium; $0.005 \leq x \leq 0.35$; $0 \leq y \leq 0.3$; and $0.7 \leq z \leq 1.9$.

4 Claims, 4 Drawing Figures

GADOLINIUM-ACTIVATED PHOSPHATE PHOSPHOR

This is a continuation of application Ser. No. 852,530 filed Nov. 17, 1977, now abandoned.

BACKGROUND OF THE INVENTION

This invention relates to a novel form of phosphate phosphor activated by gadolinium.

Ultraviolet rays included in the sunlight perform very important effects for animals. One of these effects is a sterilizing effect and the other is the so-called erythematic effect, that is, an effect of giving rise to sunburns on the skin. Erythema is generated by ultraviolet rays having a wavelength of 280 to 330 nm, and mainly at a wavelength approaching 310 nm. Ultraviolet rays falling within the above-mentioned wavelength range have the function of producing vitamin D from ergosterin due to the erythematic effect, that is, displays an antirachitic action. Further, such forms of ultraviolet rays promote the metabolism of an inorganic element such as calcium or phosphorus in a living organism. Ultraviolet rays having a wavelength of 280 to 330 nm carry out the above-mentioned functions are important for the health of human beings, and consequently are generally referred to as health rays.

In recent years, however, living environments devoid of sunlight are gradually increasing in large cities due not only to only construction of tall buildings, underground railroads, and underground streets but also pollution of the atmosphere by various contaminants. Therefore, the so-called health lamp using such a phosphor as emits the aforesaid health rays has come to be put to practical application for the object of compensating for the decrease in the period of time during which city dwellers receive the sunlight. Well-known among health ray-emitting phosphors used with such a health lamp is thallium-activated phosphate, particularly calcium zinc phosphate $(CaZn)_3(PO_4)_2/Tl$. However, this phosphor has the drawback that it has a short life performance, that is, it tends to be quickly deteriorated soon.

SUMMARY OF THE INVENTION

The object of this invention is to provide a novel phosphor which efficiently emits health rays whose wavelength falls within the range of 280 to 330 nm and indicates an excellent life performance, namely, a phosphor prepared from gadolinium-activated phosphate.

This gadolinium-activated phosphate phosphor is expressed by the general chemical formula:

$$(R_{1-x-y}Gd_xM_y)_3(PO_4)_{(2+x-y)z}$$

where R denotes at least one element selected from the group consisting of calcium, zinc, strontium, barium, and magnesium; M represents at least one element selected from the group consisting of thallium, silver, lithium, sodium, potassium, rubidium and cesium; $0.005 \leq x \leq 0.35$; $0 \leq y \leq 0.3$; and $0.7 \leq z \leq 1.9$.

DETAILED DESCRIPTION OF THE PREFERRED EMBODIMENTS

A large variety of phosphors containing gadolinium as a matrix have already been proposed. However, very few phosphors are known in which gadolinium is used as an activator. The present inventors have noticed that the gadolinium ion whose electron energy level can be transferred from 6P(7/2 to 8S emits ultraviolet rays having a wavelength approaching 312 nm, and tried to use the gadolinium as an activator. The phosphor of this invention has been developed in view of the satisfactory results of this trial.

When excited by ultraviolet rays particularly having a wavelength of 254 nm, the phosphor of this invention very efficiently emits health rays whose wavelength ranges between 280 and 330 nm. As seen from the emission spectrum distribution A of FIG. 1, the phosphor of the invention prominently sends forth a line spectrum corresponding to a wavelength approximating 312 nm.

Referring to the aforesaid general chemical formula, description is now given of the mol amount x of gadolinium and the mol amount y of the element M both based on 1 mol of the element R and the range covered by a value of the stoichiometry ratio z between a metal ion and phosphoric acid ion.

Figure 2:
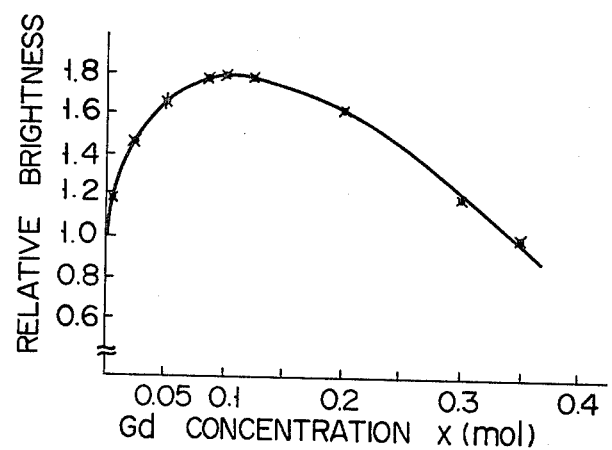
FIG. 2 graphically indicates the relationship between the relative brightness and gadolinium concentration x of the phosphor of the invention prepared from gadolinium-activated calcium phosphate containing thallium.

In FIG. 2, the relative brightness of the phosphor of this invention $(Ca_{0.985}Gd_xTl_{0.015})_3(PO_4)_{(1.985+x)}1.02$ is plotted on the ordinate and the mol amount or concentration x of gadolinium is shown on the abscissa. FIG. 2 is drawn by reference to the relative brightness of one of the prior art phosphors which does not contain gadolinium. FIG. 2 shows that the concentration x of gadolinium should preferably range between 0.005 and 0.35, or more preferably between 0.05 and 0.2.

Figure 3:
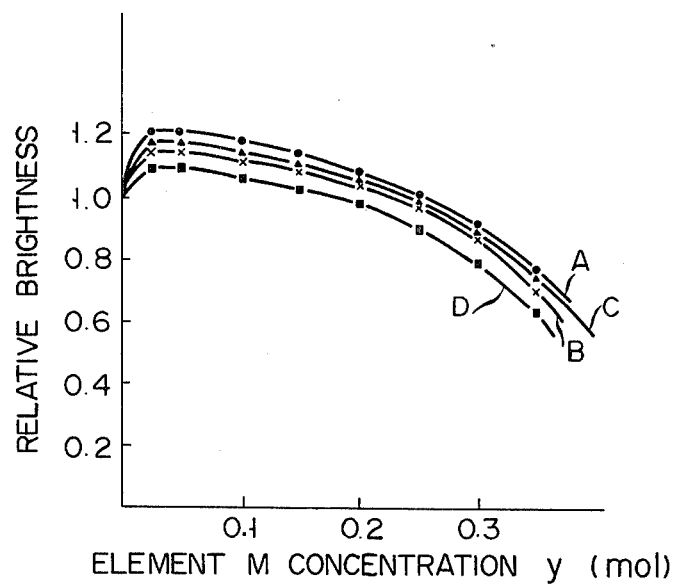
FIG. 3 graphically sets forth the relationship between the relative brightness and the concentration y of an element M with respect to the phosphor of the invention prepared from gadolinium-activated calcium phosphate containing an element M.

In FIG. 3, the relative brightness of a phosphor of this 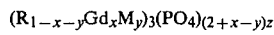 invention $(Ca_{0.9-y}Gd_{0.1}M_y)(PO_4)_{(2.1-y)}1.02$ is plotted on the ordinate, and the concentration y of the element M is indicated on the abscissa. FIG. 3 is prepared by reference to the relative brightness of a phosphor of the invention which does not contain the element M. Referring to FIG. 3, the curve A denotes the case where the element M is thallium; the curve B indicates the case where the element M is silver; the curve C shows the case where the element M is rubidium; and the curve D represents the case where the element M is lithium. The curves setting forth the relative brightness of the subject phosphor in which the element M is constituted by barium, sodium, potassium and cesium respectively lie between the curves C and D. FIG. 3 further shows that where the concentration y of the element M increases over 0.3, then the phosphor sharply drops in brightness. Even when lacking a metal element such as thallium, the phosphor of this invention prepared from gadolinium-activated phosphate sends forth fully satisfactory brightness. However, the addition of the element M at a smaller concentration y than 0.1 more prominently elevates the brightness.

Figure 4:
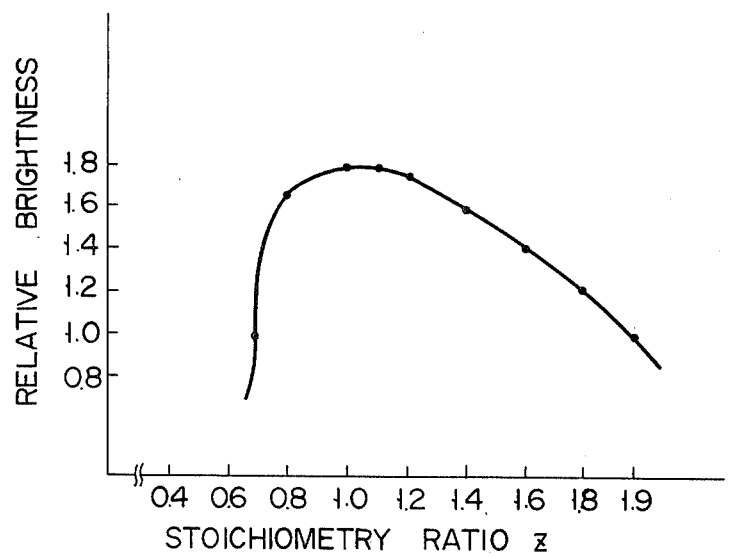
FIG. 4 graphically presents the relationship between the relative brightness and stoichiometry ratio z of the phosphor of the invention prepared from gadolinium-activated calcium phosphate containing thallium.

In FIG. 4, the relative brightness of a phosphor of this invention $(Ca_{0.885}Gd_{0.1}Tl_{0.015})_3(PO_4)_{2.085z}$ is plotted on the ordinate, and the stoichiometry ratio z is shown on the abscissa. The relative brightness was determined by reference to that of the prior art phosphor prepared from thallium-activated calcium zinc phosphate. In the case of $Z=1$, a metal ion and phosphoric acid ion are in a stoichiometric relationship. In case of $z>1$, the phosphoric acid ion is in excess of the metal ion. In case of $z<1$, the phosphoric acid ion is deficient. As apparent from FIG. 4, the stoichiometry ratio should preferably range between 0.7 and 1.9 and more preferably between 0.8 and 1.3.

The gadolinium-activated phosphate phosphor of this invention can be easily prepared by the customary process. For instance, where a mixture of a phosphate and an oxide of, for example, gadolinium, thallium, rubidium is heated to a high temperature ranging between 900° and 1,200° C., then the above-mentioned phosphor is produced. An oxide of a metal, for example, gadolinium may be replaced by a nitrate, carbonate or hydroxide of a metal which produces an oxide corresponding to the gadolinium oxide at a high temperature.

The phosphor of this invention manufactured by the above-mentioned process which gives off health rays having a wavelength falling within the aforesaid range is particularly advantageous for use with the health lamp.

This invention will be more fully understood by reference to the examples which follow.

EXAMPLE 1

A mixture of 291.91 g of $CaHPO_4$, 55.55 g of $CaCO_3$ and 54.38 g of $Gd_2O_3$ was heated 5 hours in a furnace at 1,100° C. at atmospheric pressure. After water-washed, dried and crushed, the mass was sieved by a screen of 280 mesh. A phosphor thus produced had a composition of $(Ca_{0.90}Gd_{0.10})_3(PO_4)_{2.145}$.

Figure 1:
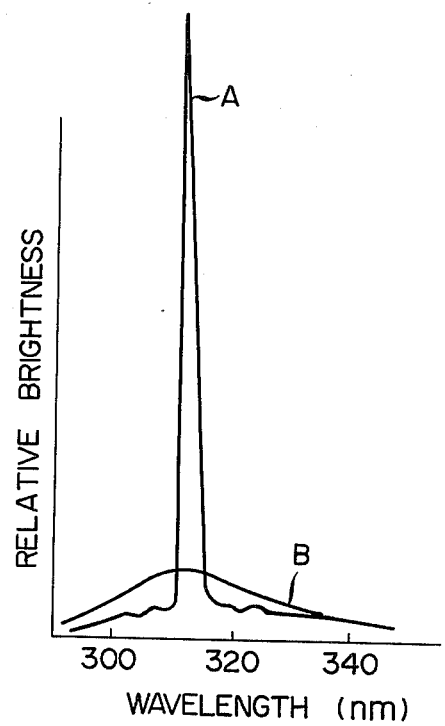
FIG. 1 shows the emission spectrum distribution of a phosphor of this invention $(Ca_{0.90}Gd_{0.10})_3(PO_4)_{2.145}$ and that of the prior art phosphor $(CaZn)_3(PO_4)_2Tl$.

When excited by ultraviolet rays emitted from a mercury lamp which had a wavelength of 254 nm, the phosphor indicated an emission spectrum distribution represented by the curve A of FIG. 1. The curve B of FIG. 1 denotes the emission spectrum distribution of the prior art phosphor prepared from thallium-activated calcium zinc phosphate. As seen from FIG. 1, the peak of the emission spectrum distribution of the phosphor of this invention is about 10 times higher than that of the prior art. Further, as measured by a selenium photocell, the phosphor of the invention showed a relative brightness 180% higher than that of the prior art. A deterioration test was conducted on both types of phosphor by applying ultraviolet rays having a wavelength of 185 nm for 3 hours.

A percentage sustenance of brightness after irradiation of the ultraviolet rays indicated 65% for the prior art phosphor and 82% for the present phosphor. This fact proves that the phoshor of this invention has an excellent life performance as compared with that of the prior art.

EXAMPLE 2

A phosphor having a composition $(Ca_{0.885}Gd_{0.10}Rb_{0.015})_3(PO_4)_{2.13}$ was produced in substantially the same manner as in Example 1, except that 289.87 g of $CaHPO_4$, 52.55 g of $CaCO_3$, 54.38 g of $Gd_2O_3$ and 6.64 g of $RbNO_3$ were mixed. The phosphor thus prepared indicated substantially the same emission spectrum distribution, relative brightness and percentage brightness sustenance as those of the phosphor of this invention produced in Example 1.

A large variety of samples of gadolinium-activated phosphate phosphor of this invention were prepared in the same manner as in the foregoing Examples 1 and 2. The samples are listed in Table 1 below, together with the chemical formulae, and the relative brightness and percentage brightness sustenance measured by the same process as in Example 1.

TABLE 1

| Samples | Phosphors | Relative brightness | Percentage brightness sustenance |
|---|---|---|---|
| 3 | $(Ca_{0.80}Zn_{0.10}Gd_{0.1})_3(PO_4)_{2.145}$ | 183% | 80% |
| 4 | $(Mg_{0.90}Gd_{0.10})_3(PO_4)_{2.145}$ | 168 | 77 |
| 5 | $(Sr_{0.90}Gd_{0.10})_3(PO_4)_{2.145}$ | 175 | 78 |
| 6 | $(Ba_{0.40}Sr_{0.50}Gd_{0.10})_3(PO_4)_{2.145}$ | 173 | 79 |
| 7 | $(Ca_{0.885}Gd_{0.10}Tl_{0.015})_3(PO_4)_{2.130}$ | 205 | 87 |
| 8 | $(Ca_{0.88}Gd_{0.10}Ag_{0.002})_3(PO_4)_{2.125}$ | 201 | 86 |
| 9 | $(Ca_{0.88}Gd_{0.10}Tl_{0.015}Ag_{0.005})_3(PO_4)_{2.125}$ | 202 | 86 |
| 10 | $(Ca_{0.50}Sr_{0.385}Gd_{0.10}Tl_{0.015})_3(PO_4)_{2.130}$ | 188 | 84 |
| 11 | $(Sr_{0.80}Mg_{0.085}Gd_{0.10}Tl_{0.015})_3(PO_4)_{2.130}$ | 179 | 81 |
| 12 | $(Ba_{0.10}Sr_{0.785}Gd_{0.10}Tl_{0.015})_3(PO_4)_{2.130}$ | 183 | 80 |
| 13 | $(Ca_{0.785}Zn_{0.10}Gd_{0.10}Rb_{0.015})_3(PO_4)_{2.13}$ | 186 | 82 |
| 14 | $(Ca_{0.885}Gd_{0.10}Li_{0.015})_3(PO_4)_{2.13}$ | 170 | 79 |
| 15 | $(Ca_{0.885}Gd_{0.10}Na_{0.015})_3(PO_4)_{2.13}$ | 174 | 80 |
| 16 | $(Ca_{0.885}Gd_{0.10}Cs_{0.015})_3(PO_4)_{2.13}$ | 182 | 84 |
| 17 | $(Mg_{0.15}Sr_{0.735}Gd_{0.10}Rb_{0.015})_3(PO_4)_{2.13}$ | 175 | 81 |
| 18 | $(Ca_{0.80}Sr_{0.085}Gd_{0.10}Rb_{0.015})_3(PO_4)_{2.13}$ | 181 | 80 |
| 19 | $(Ba_{0.40}Sr_{0.485}Gd_{0.10}Rb_{0.015})_3(PO_4)_{2.13}$ | 173 | 82 |
| 20 | $(Ca_{0.885}Ga_{0.10}Rb_{0.010}Cs_{0.005})_3(PO_4)_{2.13}$ | 188 | 83 |
| 21 | $(Ca_{0.785}Zn_{0.10}Gd_{0.10}Rb_{0.010}Cs_{0.005})_3(PO_4)_{2.13}$ | 187 | 85 |
| 22 | $(Ca_{0.885}Gd_{0.10}Rb_{0.010}K_{0.005})_3(PO_4)_{2.13}$ | 183 | 80 |

As will be apparent from the foregoing examples the phosphor of this invention prepared from a gadolinium-activated phosphate has an excellent brightness and life performance than the prior art phosphor produced from thallium-activated phosphate.

What we claim is:

1. A gadolinium-activated calcium phosphate phosphor of the formula:

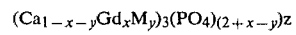

$(Ca_{1-x-y}Gd_xM_y)_3(PO_4)_{(2+x-y)z}$ wherein M is at least one member selected from the group consisting of thallium and silver; $0.005 \leq x \leq 0.35$, y is greater than zero and less than 0.1, and $0.7 \leq z \leq 1.9$ and wherein M is present in an amount sufficient to effect a brightness that is greater than that of the phosphor absent M; said phosphor emitting ultraviolet rays having a wavelength ranging between 280 to 330 nm when excited by ultraviolet rays having a wavelength of 254 nm, and exhibiting a line spectrum corresponding to a wavelength approximating 312 nm.

2. A gadolinium-activated phosphate phosphor according to claim 1, wherein x is not less than 0.05 nor greater than 0.2.

3. A gadolinium-activated phosphate phosphor according to claim 1, wherein z is not less than 0.8, nor greater than 1.3.

4. A gadolinium-activated phosphate phosphor according to claim 1 wherein M is thallium.

* * * * *